June 10, 1952
A. BAÑOS, JR
2,600,186
CAVITY RESONATOR
Filed Oct. 3, 1945
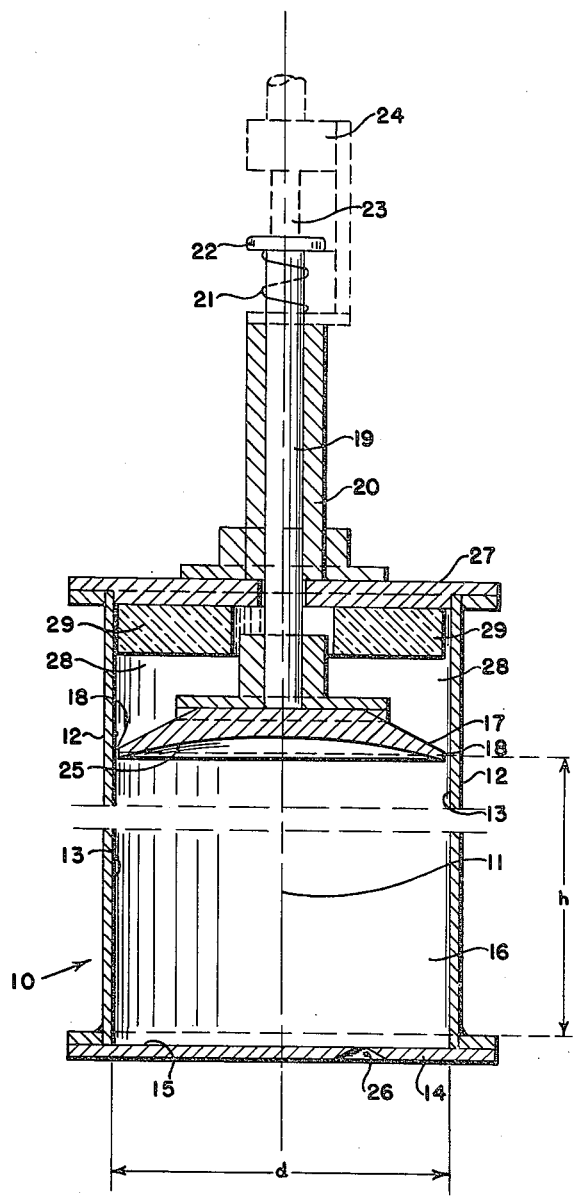
INVENTOR.
ALFREDO BAÑOS JR.
BY
ATTORNEY

Patented June 10, 1952

2,600,186

UNITED STATES PATENT OFFICE 2,600,186

CAVITY RESONATOR

Alfredo Baños, Jr., Cambridge, Mass., assignor, by mesne assignments, to the United States of America as represented by the Secretary of War Application October 3, 1945, Serial No. 620,128

3 Claims. (Cl. 178—44)

This invention relates to wave meters and more particularly to resonant cavities, often termed echo boxes.

An echo box is a structure having a resonant cavity internally surfaced by electrically conductive material. Usually the shape of the cavity is simple, as the modes, or manners in which geometrically simple cavities resonate in response to electromagnetic energy supplied thereto are more easily calculable than for other shapes.

For many geometrical configurations the mode of the resonant oscillations, and the resonant frequencies thereof are mathematically computed with ease and known to the art.

In general, echo boxes have many uses in dealing with electromagnetic radiation in the microwave region. Among these may be mentioned employment with radio echo detection apparatus to provide artificial or "phantom" targets which may be used to tune a receiver when no real targets are conveniently available. Echo boxes have a very high Q, of the order of 100,000, and when excited by pulsed radiation of the nature customarily used in radio echo detection apparatus the cavity will ring or oscillate for several microseconds after the terminaton of a transmitted pulse. During the oscillation time, or ringing time, energy is returned to the radio detection apparatus to produce signals. Another use of an echo box may be for tuning a receiver to the echo thus returned. One common use is as a wavemeter. A cavity of adjustable size is calibrated, the adjustment at a point of maximum amplitude of resonance providing a frequency measure, and such a wavemeter is especially useful in transmitter adjustment because receiver tuning need not affect the results. Another common use may be as a high Q circuit.

One especially common and useful geometrical configuration for an echo box cavity is a right circular cylindrical cavity to which energy may be supplied or withdrawn directly through one or more apertures in the walls, or through pickup loops inserted therethrough, or the like.

Cylindrical cavities may be manufactured with ordinary precision machinery with ease and great accuracy. A difficulty which has been encountered heretofore, however, and the cause for which has been substantially eliminated by this present invention, as will appear more fully hereinafter, is that unless the end plates (the top and bottom plates) of the cylindrical cavity are parallel to a high degree of accuracy, the echo box has a decidedly inferior characteristic in that the Q of the box is very much lowered, and the response or ringing time consequently decreased. This difficulty has required the use of various adjustable means to provide the desired degree of parallelism between the plane surfaces of the end plates as will be mentioned hereinafter. These adjustments are highly critical, and require electrical tests usually suitable to be performed only at the factory or at a test bench, and sealing and locking of the adjustable means after the test. The possibilities of the adjustment being impaired by mechanical vibrations, temperature changes, and necessary handling of the box, and the further requirement of strict tolerances prove a burden in the manufacture and use of cylindrical echo boxes.

Therefore, among the objects of this invention are to provide an echo box, the high Q of which is not seriously affected by the failure to meet close mechanical tolerances; to reduce the mechanical complications in the manufacture of echo boxes; to eliminate the necessity of a factory adjustment or test bench by providing a more easily adjustable echo box; to provide an echo box whose adjustment is simple; to provide such a box whose calibration is more stable, more secure, and more reliable; to provide such a box in which it will not be necessary to make a difficult adjustment for the end plates; to provide an echo box whose construction will produce an electromagnetic resonator, the ringing time of which is relatively insensitive to slight misalignment of the end plates; and to provide an echo box whose construction is comparatively simple for manufacturing purposes.

Further objects, advantages, and novel features of the invention will be apparent from the description hereinafter contained, in which reference is made to the drawing of a preferred embodiment of the invention shown in the single figure of the drawing.

Referring now to the drawing, there is illustrated in cross-section an echo box 10 of circular cylindrical conformation as improved in accordance with the teachings of the invention. The section is taken in a plane through an axle 11. Side wall or enclosing member 12 affords inner conductive surface 13 which is circularly symmetric about axis 11. Base member 14 affords an inner conductive surface 15 which is planar and perpendicular to axis 11 and the line elements of cylindrical surface 13. Into the cylindrical cavity 16 formed by cylindrical surface 13 and base surface 15 is inserted top member 17, which thereby completely encloses cavity 16 except for a small uniform annular space or gap 18 of the order of one or two hundredths of wavelength between member 17 and surface 13 and substantially concentric therewith. Cavity 16 is adjustable in depth by means adapted to move top member 17 piston-wise along the direction of axis 11. Such means, as illustrated, may comprise a sleeve 20 held in fixed relation to wall 12 to maintain the alignment of rod 19 and top member 17; a spring 21 engaging a head 22 attached to rod 19 thereby urging head 22 firmly against caliper rod 23, which is threaded through caliper head 24, which, in turn, is attached to sleeve 20. It is clear that a reading of the advancement of caliper rod 23 into head 24 (such as may be made on the customary vernier which is not shown in the drawing) may be calibrated to read the depth $h$ of cavity 16, and the consequent resonant frequency in a desired mode of oscillation.

One of the important features displayed in the drawing of Fig. 1 is the shape of the surface 25 presented to cavity 16 by top member 17. Surface 25 is spherical, of the order of a few hundredths of a wavelength in depth and of the order of three or four wavelengths in radius of curvature, the radius of curvature being colinear with axis of symmetry 11. In regard to other dimensions, diameter $d$ of box 10 is somewhat less than one wavelength in the band of contemplated operating frequencies the inside height $h$ of box 10 is around two wavelengths. Depth or height $h$ may be defined and measured as the distance from planar surface 15 to a plane substantially perpendicular to axis 11 and parallel to surface 15 enclosing a cylindrical volume equal to the volume of cavity 16. Surface 25 is a relatively small spherical deformation from the planar with a center of curvature substantially on the axis of cylindrical surface 13. Thus the entire spherical deformation consists of a spherical section which subtends an arc of roughly .25 radians. A slightly deeper spherical deformation subtending an arc of about .65 radians has given even better results than the one of longer radius of curvature in experiments conducted therewith.

The depth of the spherical portion, may be increased still further, but the optium location of feed orifice 26 may then have to be determined anew, perhaps by trial and error, as the energy concentrations of the fields are substantially altered.

In order to improve the Q of cavity 10, surfaces 13, 15 and 25 should be highly conductive, and for this purpose wall 12 and end pieces 14 and 17 may be constructed of brass, and the surfaces may be carefully polished, buffed, and silver plated.

To transfer energy into or out of cavity 10, a small aperture or window 26 may be located on a diameter of circular surface 15 for use in conjunction with a wave guide or coaxial cable. The window 26 is placed a distance from axis 11 for maximum coupling to the chosen operating mode. Other positions of the window are possible which are highly efficient, for example in the side wall. The edge of aperture 26 may be bevelled as shown to improve the coupling. Member 20 may be attached to a fixed cover 27 forming what may be termed in the art a "back cavity" 28. Lossy material 29 may be utilized to minimize the effects of back cavity 28.

Before explaining the invention it is desirable to examine in part the theory of a cavity resonant to electromagnetic oscillations.

Modes of eletcromagnetic oscillation in cavities are designated usually by a three-number system, instead of the two-number system used for modes in wave-guides. The same cavity can oscillate at several different modes. The lowest frequency at which a cavity may resonate is usually termed the fundamental, and higher frequencies at which the cavity resonates are termed harmonics usually only when integral multiples of the fundamental frequency. Cavity resonators may have various shapes, including shapes which result from taking sections of wave guides or coaxial cables and closing the ends. Since the flow of electrons is largely confined to an exceedingly thin layer of metal on the inner surface of the cavity, this layer should have low electrical resistance to avoid losses. In some cases, since only the conductivity of the inner surface is of importance, the cavity may be constructed of non-conducting materials with the inner surfaces painted or covered with a thin layer of metal or foil, or the structure may be of a metal of lower conductivity coated or plated with a metal of higher conductivity, as cavity 10, wherein members 12, 14 and 17 are of brass, with surfaces 13, 15 and 25 silver plated.

For a cylindrical cavity, the modes are designated as TE or TM (transverse electric or magnetic respectively). One simple manner of expressing non-mathematically the subscripts indicating the conformation of the mode is that the first number indicates the number of whole (or full wave) patterns of the vector lines encountered in traversing a circumference of a circular cross section of the cavity, the second subscript indicates the number of half-wave patterns that are crossed in traversing a radius, and the third subscript indicates the number of half-wave patterns encountered in traversing the cavity in an axial direction, along its length or depth.

Actually, of course, the numbers indicating the modes of resonant oscillation of the cavity arise in the solution of the field equations because of the necessity of satisfying the boundary conditions which require that no electric vector can exist tangentially on a perfectly conductive surface.

For a more thorough discussion of the theory of electromagnetic oscillations in resonant cavities, refence may be made to "Principles of micro-wave radio" by E. U. Condon, published in Review of Modern Physics, volume 14, Number 4, October 1942. Although the notation adopted herein may differ somewhat from that contained in the reference publication, the terminology adopted is the same, and, as pointed out in the publication, is borrowed from that of analogous problems in mathematical physics and particularly in quantum mechanics.

Naturally, different viewpoints may be adopted in investigating the theoretical aspects of echo boxes. One manner of attacking the problem is indicated in part by the article by E. U. Condon, to which reference is made above. There, for instance, the modes are ordered by a set of numbers, $a$. However, there is no continuation of theory therein analyzing the problems involved in physical echo boxes in which the walls of the cavity have a finite conductivity, in which there are minute variations from the geometric figure adopted as a model, in which there is interplay between modes caused by the insertion of a coupling loop or other driving means into the cavity, etc. One way of continuing the attack on the problems involved is to set up a series of normalized orthogonal vector wave functions $E_a$ as in the article (which, as may be shown, may be taken to represent the orientation of the E vectors within the cavity, or functions $H_a$ the H vectors, the vector function being taken accordingly to be normal or tangential respectively to the conductive surfaces), in which series the coefficients of the orthogonal functions $E_a$ are taken as $k_a^2 q_a$ wherein $k_a$ is the wave number, and $q_a^{(t)}$ is an amplitude function of time. This series may represent the E field, or a series of the functions $H_a$ with coefficients $k_a q_a$ may be used to represent the H field. The coefficients may be determined to satisfy specified boundary conditions, as the field equations are satisfied term by term. These coefficients and therefore each $q_a(t)$, may be determined explicitly by utilizing the orthogonal characteristics of the normalized functions in a manner analogous to that used in determining Fourier series coefficients. However, without explicitly determining at this point $q_a(t)$ as the amplitude function of time associated with the $a$th mode, it is possible to write down the set of dynamical Lagrangian equations governing their behavior.

As an example of the methods involved in the use of Lagrangian equations, and the significance thereof, reference may be made to J. H. Jeans, "Electricity and Magnetism," Cambridge University Press (1927), chapter XVI. For a loss-free cavity these Lagrangian equations may be written:

$$\frac{d}{dt}\left(\frac{\partial T}{\partial \dot{q}_a}\right) + \frac{\partial V}{\partial q_a} = 0$$

where the subscript $a$ labels all the linearly independent modes of oscillation and where, as customary, one identifies the kinetic energy $T$ with the total magnetic energy of the system and the potential energy $V$ with the total electric energy. Terms may now be provided to represent external exciting current, dissipation losses in the walls of the cavity, and other departures from a loss-free geometrically perfect resonator.

On the basis of the system of equations obtained by the theory, an equivalent circuit of a dissipative geometrically non-perfect cavity fed through a coaxial line and loop input may be visualized as follows: Each normal mode may be replaced by a closed resonant mesh consisting of resistance, inductance, and capacitance in series. Each mesh is coupled resistively to all modes of a set for which these mutual resistances do not vanish, and similarly coupled by mutual inductances and elastances (inverse capacitances), and further each mesh in turn is coupled to an additional mesh representative of the external input circuit (if a coupling loop is used, each is coupled to the additional mesh inductively—other types of coupling are possible) with certain coefficients of mutual induction.

By means of the theory developed in the manner outlined above, it is possible to show that in a perfect loss-free cylindrical cavity there is no direct coupling between modes. If the cavity walls are not perfectly conductive, so that the cavity is not loss-free, resistive coupling between pairs of modes may occur subject to certain selection rules, as previously mentioned. In particular, for $TE_{0,m,n}$ modes these selection rules indicate that such resistive coupling occurs only between modes whose resonant frequencies never coincide either accidentally or otherwise.

This fact is important in the analysis since coupling between modes only assumes significance, for the purposes of this problem, when such coupling occurs between modes of exactly the same resonant frequency, or nearly so. In addition to the resistive coupling mentioned above, there are other forms of coupling arising from other sources. Thus, for example, it is clear that the orifice or aperture 26 through which a coupling loop may be introduced and the loop or probe or coupling device itself are sources of coupling between certain pairs of modes. Other sources may be insulating gap such as 18 between the end plate such as 17 of the side wall such as 13; eccentricity or non-uniformity of radius of an end plate such as either 17, or both end plates if both do not physically contact the side walls, resulting in non-uniformity in gaps such as 18; the existence of a back cavity such as 28 which lies behind the annular gap and between members 17 and 27; any small ellipticity or variation from the circular in the cross section of the cylinder; and, most important from the standpoint of the improvement accomplished by this invention, lack of exact parallelism or tilting between end plates such as 14 and 17, especially where the latter has a planar surface, instead of spherical surface such as 25, presented to surface 15. If such surface is not planar, but has some other geometrical configuration, such as surface 25, tilting of the end plate may be defined as the existence of an angle between an axis of symmetry of surface 25 and the axis of cylinder such as 11, if such axes are in coincidence for geometrically perfect construction.

It may be further shown that the $TE_{0,m,n}$ modes in cylindrical cavities are the only ones for which no surface currents tend to flow across a gap such as 18 between the end plates such as 17 and the cylindrical surface such as 13. Therefore, the characteristic frequencies for these modes are little affected by these gaps or back cavities. Furthermore, these modes have the highest Q values, other modes having lower Q values other things being equal. In addition, other modes are greatly affected by the presence of the gap and back cavities, because they require current flow across the gap, thus causing coupling to back cavity and other losses. For these reasons the oscillating modes of a tunable echo box are nearly always a member of the $TE_{0,m,n}$ family of modes, usually with $m$ equal to one.

In a perfect right circular cylinder, any $TE_{0,m,n}$ mode is degenerate with the companion pair $TM_{1,m,n}$ (even and odd) modes so that a case of triple intrinsic degeneracy occurs which becomes of importance when considering the effect of a tilt of one of the end plates such as 17. As pointed out in the foregoing, the Q's of the $TM_{0,m,n}$ degenerate modes are adversely affected, most particularly by gaps such as 18. The theory above advanced has indicated that a tilt of one of the end plates such as 17 results in coupling the degenerate modes with the operating $TE_{0,m,n}$ mode. If said tilt is considered as the vector sum of two component tilts mutually perpendicular, and the TM degenerate mode having an axis of symmetry along one component tilt is considered odd, and along the other one even, the tilt along one axis causes coupling to one of said degenerate modes, and the tilt along the other axis causes coupling to the other degenerate mode. In the equivalent circuit the coupling is substantially inductive. It may be shown both theoretically and experimentally that this inductive coupling between modes of the same frequency is highly detrimental to the operation of the cylindrical resonator as an echo box.

As an anology, consider a complicated circuit consisting of many meshes, each series resonant, in which one mesh representing an operating mode is coupled to two other meshes representing the companion degenerate modes of the same resonant frequencies by mutual impedances, say inductances. There may be further coupling between these three among themselves and with other meshes in the circuit by other means such as mutual inductances, elastances (inverse capacitances), and resistances. However, the other meshes have resonant frequencies different from that of the meshes representing the operating mode and its companion degenerate modes. If the operating mode mesh is excited at its resonant frequency it is clear in a qualitative way that the two other meshes in which the greatest currents will flow will be the companion degenerate meshes which have the same resonant frequency. If, furthermore, the Q's of the companion degenerate meshes or one of them, is degraded considerably below that of the operating mesh, it is again clear in a qualitative way, due to the high currents excited in the resonant meshes of lower Q, that the Q of the entire circuit at this operating frequency is adversely affected in an appreciable manner.

In previous echo box construction of the right-circular cylindrical configuration it has been necessary in practice to make some provision for setting into extremely exact parallelism the planar surface of one end plate such as 15 and the planar surface of the opposite end plate. Provision may be made for such an adjustment by using a false bottom type of construction in which a set of screws move one end plate in adjustable tilting relationship to the side wall axis. Electrical tests were then made to determine the best adjustment and the adjustments usually were locked and sealed.

In this manner, the two end plates were brought into such nearly exact parallelism that coupling between the desired $TE_{0,m,n}$ modes and companion degenerate odd and even $TM_{1,m,n}$ modes was reduced. The reduction in coupling resulted in maintaining the Q of the circuit at a high figure.

However, if one of the end plates is deformed from a planar surface to a surface of spherical symmetry, such as surface 25, which has its axis of circular symmetry extending substantially along the axis of the cylindrical side walls, there is a shift in the resonant frequency of those modes which were companion degenerate modes in the undeformed cavity.

Returning for a moment to the theory, the total electric and magnetic energies inside the cavity are respectively:

$$T = \tfrac{1}{2}\mu_0 \int_V \sum_a \sum_b k_a k_b q_a q_b (H_a \cdot H_b) dr = \tfrac{1}{2} \sum_a L_a q_a^2$$

$$V = \frac{1}{2\epsilon_0} \int_V \sum_a \sum_b k_a^2 k_b^2 q_a q_b (E_a \cdot E_b) dr = \tfrac{1}{2} \sum_a \frac{q_a^2}{C_a}$$

wherein $L_a = \mu_0 k_a V$ henries and $$C_a = \frac{E_0}{k_a^4 V} \text{ farads}$$

represent the self-inductances and self-capacitances respectively of each resonant mesh of an equivalent circuit. The integrals extend over the cavity volume. In particular, if it is desired to investigate the change in self-inductances or self-capacitances, due to a small variation from some simple geometrical shape, we may compute the increment of $L_a$ from $$\frac{\Delta L_a}{L_a} = \frac{1}{V} \int_{\Delta V} H_a^2 dr$$

where the integral is taken over the difference volume, or volume additional to the original geometrical configuration.

A similar process for the increment of self-capacitances gives:

$$\frac{\Delta C_a}{C_a} = -\frac{1}{V} \int_{\Delta V} E_a^2 dr$$

from which:

$$\frac{\Delta k_a}{k_a} = \frac{1}{2V} \int_{\Delta V} (E_a^2 - H_a^2) dr$$

since $\omega_0^2 L_a C_a = 1$, $L_a = \mu_c k^2_a V$, and $$C_a = \frac{E_0}{k_a^4 V}$$

Thus, having knowledge of the functions $E_a$ and $H_a$ for a given geometrical configuration, it is possible to compute the increment in $L_a$ and $C_a$, at least to a first approximation, in a variation from the original configuration and consequently, at least to a first degree approximation, the change in frequency in an equivalent resonant mesh circuit having inductances and capacitances $L_a$ and $C_a$ respectively. Applying this process to the case of the spherical deformation from a planar end plate, it may be shown that with the total cavity volume unchanged the principal mode suffers no change in resonant frequency, but that the two companion degenerate modes do change in resonant frequency due to the deformation to a first degree approximation.

Referring again to the rough analogy introduced hereinbefore we see that whatever coupling exists between the resonant operating mesh and the meshes representing the companion degenerate modes is no longer a coupling between resonant circuits having the same resonant frequency. On the contrary, those meshes representing the companion degenerate modes now have resonant frequencies displaced from the resonant frequency of the main operating mode, with the result that lower currents are introduced in the two companion degenerate meshes. Therefore, a degraded Q in these two meshes no longer has the pronounced effect in reducing the Q of the resonant operating circuit to which they are coupled.

Whatever may be the accuracy of the analogy or the analysis, it has been proved experimentally that an echo box having the configuration illustrated in the accompanying figure, instead of the configuration in which both end plates such as 17 and 14 have planar surfaces presented to each other, has a longer ringing time, and generally improved characteristics.

In further marked distinction to the older type of echo boxes, the echo box of the invention displays a relative insensitivity to a tilting of the end plate surfaces. Therefore, it is not desired to bind the invention by any analogy or theory herein discussed, which were introduced only as the probable explanation of the observed phenomena.

Although surface 25 has a spherical conformation, other types of deformation from the planar will accomplish the desired result. Any type of deformation which is circularly symmetric with the axis of the cylindrical surface of the cavity, that is, one in which a cross section along a plane generally perpendicular to that axis would show a circle as the curve of intersection with the inner surface of the deformed portion. Similarly, any deformation which may be approximated closely by the spherical type will cause the required improvement. Thus, the deformation may be paraboloidal, having an axis extending substantially along the cylindrical axis of the cavity.

It will be apparent to those skilled in the art that many variations of the invention may be made without departing from its scope and spirit. Therefore, it is not desired to restrict the invention except by the accompanying claims.

What is claimed is:

1. A cavity resonator having a desired mode of oscillation comprising: a hollow cylindrical first member; a second member having a plane surface closing one end of said first member, said plane surface being substantially perpendicular to the longitudinal axis of said first member; a third member movable relative to said first member extending into the other end of said first member, said third member having a concave surface facing said plane surface and symmetrically disposed about said longitudinal axis, the periphery of said concave surface being substantially contiguous with the inside surface of said first member and in spaced relationship therewith, whereby the boundaries of said cavity resonator are defined by said plane surface, said concave surface and the inside surface of said first member therebetween, said concave surface having a curvature which subtends an arc of no more than 0.65 radians; and said plane surface, said concave surface and the inside of said first member being composed of highly polished non-magnetic material having a high electrical conductance.

2. A cavity resonator according to claim 1, wherein said concave surface has a curvature which subtends an arc of substantially 0.25 radians.

3. A cavity resonator having a desired mode of oscillation comprising: a hollow cylindrical first member; a second member having a plane surface closing one end of said first member, said plane surface being substantially perpendicular to the longitudinal axis of said first member; a third member extending into the other end of said first member, said third member having a concave surface facing said plane surface and symmetrically disposed about said longitudinal axis, the periphery of said concave surface being substantially contiguous with the inside surface of said first member and in spaced relationship therewith by an amount between 0.01 and 0.02 wavelengths at the operating frequency, whereby the boundaries of said cavity resonator are defined by said plane surface, said concave surface and the inside surface of said first member therebetween, said concave surface having a curvature which subtends an arc of no more than .65 radians; said plane surface, said concave surface and the inside of said first member being composed of highly polished material having a high electrical conductance; a fourth member closing the other end of said first member, a fifth member passing through said fourth member and attached to said third member for varying the distance between said concave surface and said plane surface, said fourth member comprising glossy material substantially covering the inside surface thereof.

ALFREDO BAÑOS, JR.

REFERENCES CITED

The following references are of record in the file of this patent:

UNITED STATES PATENTS

| Number | Name | Date |
| --- | --- | --- |
| 2,233,263 | Linder | Feb. 25, 1941 |
| 2,245,627 | Varian | June 17, 1941 |
| 2,261,130 | Applegate | Nov. 4, 1941 |
| 2,269,456 | Hansen | Jan. 13, 1942 |
| 2,286,408 | Hansell | June 16, 1942 |
| 2,304,540 | Cassen | Dec. 8, 1942 |
| 2,323,201 | Carter | June 29, 1943 |
| 2,372,228 | Schelkunoff | Mar. 27, 1945 |
| 2,405,612 | Schelkunoff | Aug. 13, 1946 |
| 2,409,321 | Stephan | Oct. 15, 1946 |
| 2,410,109 | Schelleng | Oct. 29, 1946 |
| 2,489,075 | Bishop | Nov. 22, 1949 |